(12) United States Patent
Dugan

(10) Patent No.: US 10,687,513 B2
(45) Date of Patent: *Jun. 23, 2020

(54) REDUCE PULL LEASH APPARATUS AND METHODS

(71) Applicant: Liam A. Dugan, Sleepy Hollow, NY (US)

(72) Inventor: Liam A. Dugan, Sleepy Hollow, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,869

(22) Filed: Sep. 30, 2018

(65) Prior Publication Data

US 2019/0029225 A1 Jan. 31, 2019

Related U.S. Application Data

(63) Continuation-in-part of application No. 15/476,975, filed on Apr. 1, 2017.

(51) Int. Cl.
*A01K 27/00* (2006.01)

(52) U.S. Cl.
CPC .......... *A01K 27/005* (2013.01); *A01K 27/003* (2013.01); *A01K 27/009* (2013.01)

(58) Field of Classification Search
CPC ............................. A01K 27/005; A01K 27/003
See application file for complete search history.

(56) References Cited

U.S. PATENT DOCUMENTS

| | | | |
|---|---|---|---|
| 4,879,972 A | 11/1989 | Crowe | |
| 4,993,366 A | 2/1991 | Sager | |
| 6,237,539 B1 | 5/2001 | Sporn | |
| 6,626,132 B1 | 9/2003 | Mann | |
| 6,694,923 B1 | 2/2004 | Fouche | |
| 7,165,511 B1 | 1/2007 | Brezinski | |
| 9,271,476 B1 | 3/2016 | Flynn | |
| 2002/0035968 A1 | 3/2002 | Prusia | |
| 2008/0072849 A1 | 3/2008 | Henderson | |
| 2009/0173289 A1 | 7/2009 | Cobb | |
| 2015/0150221 A1 | 6/2015 | Schlosser | |

(Continued)

FOREIGN PATENT DOCUMENTS

| | | |
|---|---|---|
| DE | 10300805 | 8/2004 |
| FR | 3053570 | 1/2018 |

OTHER PUBLICATIONS

Restriction Requirement of U.S. Appl. No. 15/476,975 dated Feb. 7, 2019.

(Continued)

*Primary Examiner* — Jessica B Wong
(74) *Attorney, Agent, or Firm* — Dugan & Dugan, PC

(57) ABSTRACT

In some embodiments, a reduced-pull leash device includes a first extendible leash section and a second leash section. The second leash section is longer than the unextended first leash section. The first leash section's first end is configured to couple to or near the second leash section's first end. The first leash section's second end is configured to couple to a harness at a location on top of a dog. The second leash section's second end is configured to couple to a harness at a front location of the dog. The lengths of the first and second leash sections are configured so the first leash section extends when a dog pulls on the leash until the second leash section becomes taut. Once the second leash section becomes taut, a lateral force is generated on the dog to pull the dog laterally. Numerous other embodiments are provided.

20 Claims, 13 Drawing Sheets

(56) References Cited

U.S. PATENT DOCUMENTS

| | | | |
|---|---|---|---|
| 2015/0223432 A1 | 8/2015 | Lund |
| 2016/0262353 A1 | 9/2016 | Arnold |
| 2016/0338322 A1 | 11/2016 | Letke |
| 2017/0347631 A1 | 12/2017 | Dolan |
| 2018/0279581 A1 | 10/2018 | Dugan |

OTHER PUBLICATIONS

Pet Expertise—Freedom Harness; Priority of at least Jul. 13, 2009 via earliest available review (Year: 2009)—Https://www.petexpertise.com/freedom-no-pull-dog-harness-multi-functional-with-velvet-cushioning/.

Office Action of U.S. Appl. No. 15/476,975 dated Aug. 14, 2019.

Amazon—EzyDog Zero Shock Leash—Best Shock Absorbing Dog Leash, Control & Training Lead, http://a.co/3kr6sBx.

Amazon—ThunderLeash No Pull Solution Dog Leash, http://a.co/8BPfgVu.

In the Company of Dogs—Forza Harness for Larger Dogs, https://www.inthecompanyofdogs.com/itemdy00.aspx?T1=D164048+RD+XXL&GASearchTerm=ForZA%20hAR.

In the Company of Dogs—Reflective Two-Tone Dog Leash, https://www.inthecompanyofdogs.com/itemdy00.aspx?T1=D176042+PK&GASearchTerm=Reflective%20tw.

ThunderLeash, No-Pull Solution, Fitting Instructions, http://www.thundershirt.com.au/media/docs/thunderleash-fitting.pdf.

Chewy—ThunderLeash Dog Leash, Black, https://www.chewy.com/thunderleash-dog-leash-black/dp/117711.

In the Company of Dogs—Multifunctional Waist Belt with Bungee Leash, https://www.inthecompanyofdogs.com/itemdy00.aspx?T1=D172054&GASearchTerm=waiste/%20bel.

In the Company of Dogs—The Walkie No-Pull Leash : https://www.inthecompanyofdogs.com/itemdy00.aspx?ID=201,1229&T1=D13159+BK+S.

10-Configuration Training Lead, https://usadogshop.com/10-Configuration-Training-Lead-Can-be-used-w-Freedom-Harness/, p. 1-2 (accessed Jul. 12, 2017).

May 7, 2019 Reply & Preliminary Amendment to Feb. 7, 2019 Restriction Requirement of U.S. Appl. No. 15/476,975.

Amazon.com_ EzyDog Zero Shock Leash; http://a.co/3kr6sBx.

Amazon—ThunderLeash No Pull Solution Dog Leash; https://www.amazon.com/dp/B00CA66DKI/ref=cm_sw_r_cp_ep_dp_voFFAbV72297E.

Five barking dogs—Freedom No Pull Harness Training Package; https://www.fivebarkingdogs.com/No-Pull-Freedom-Harness-and-Leash-Deluxe-TrainingPackage_p_138.html.

In the Company of Dogs—Clap Training Leash for Dogs; https://www.inthecompanyofdogs.com/itemdy00.aspx?T1=D175022&GASearchTerm=clap%20trai.

Forza Harness for Larger Dogs; https://www.purrfectdesign.net/en/tre-ponti-forza-dog-harness.html.

Reflective Two-Tone Dog Leash; https://www.amazon.com/Company-Animals-All-One-Multi-Purpose/dp/B01EAQDGN2/ref=sr_1_2?keywords=reflective+two-tone+dog+leash&qid=1573145094&s=pet-supplies&sr=1-2.

ThunderLeash, No-Pull Solution, Fitting Instructions; https://www.thundershirt.com/media/docs/TLeash_US_Instructions_12.4.15.pdf.

Chewy—ThunderLeash Dog Leash; https://www.chewy.com/thunderleash-dog-leashblack/dp/117711.

Tuff Mutt Hand-Free Bungee Leash; https://www.chewy.com/tuff-mutt-hands-free-bungee-leash/dp/136501?utm_source=google-product&utm_medium=cpc&utm_campaign=hg&utm_content=Tuff%20Mutt&utm_term=&gclid=EAlalQobChMlsLDa-7675gIVFniGCh1PdAsEEAQYASABEgILxPD_BwE.

Freedom No Pull Harness; https://freedomnopullharness.com/freedom-no-pull-harness-available-in-xsm-sm-md-lg-xlg-and-2xlg-22-colors/.

4-Configuration Freedom Training Leash; https://freedomnopullharness.com/4-Configuration-Training-Lead-to-use-w-Freedom-Harness-c-52/.

Dec. 16, 2019 Reply to Office Action of U.S. Appl. No. 15/476,975.

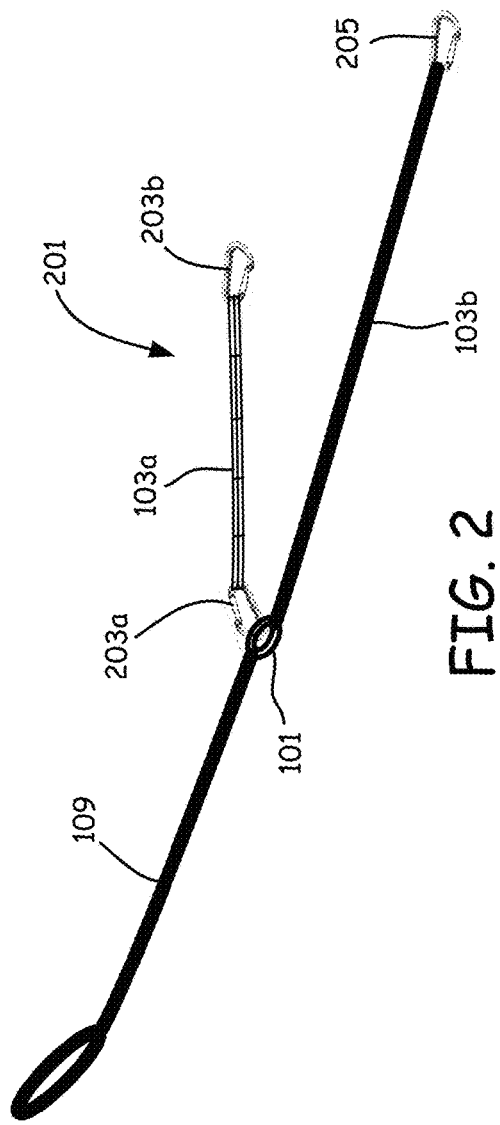
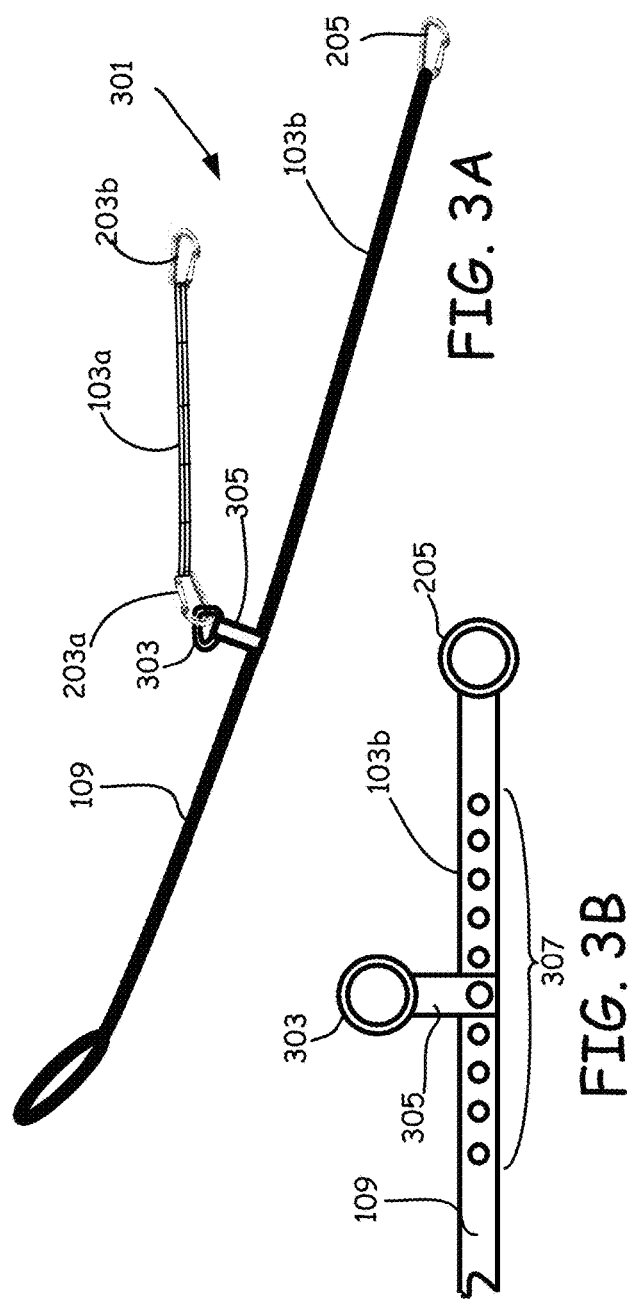

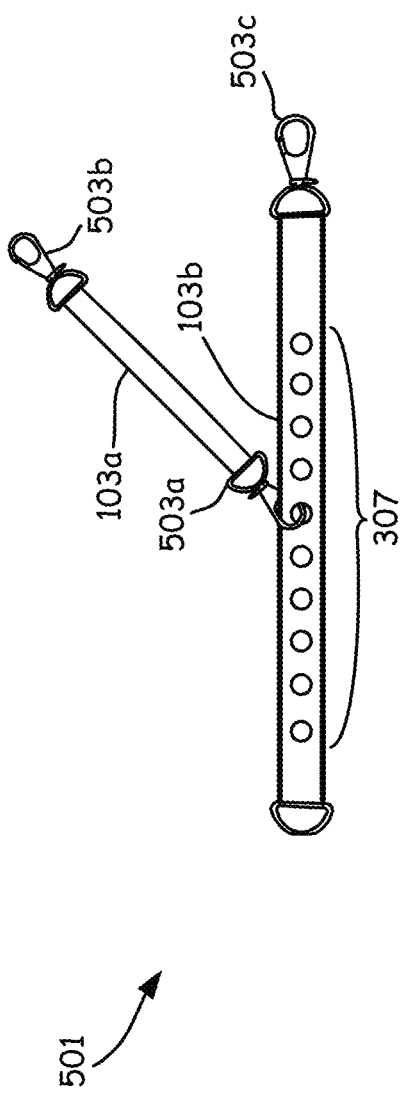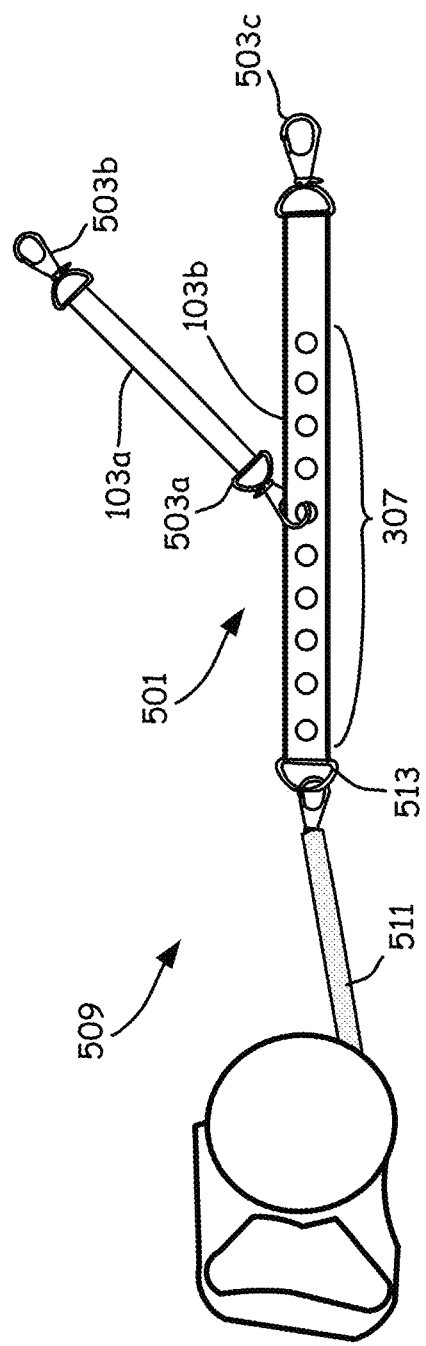

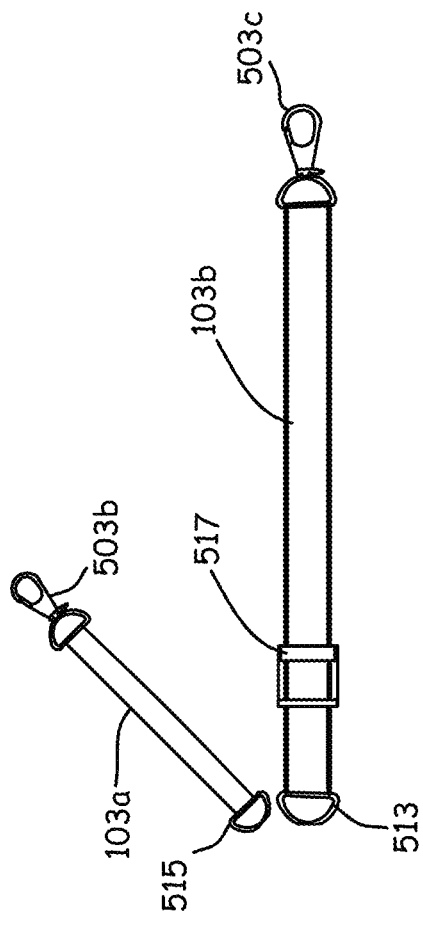
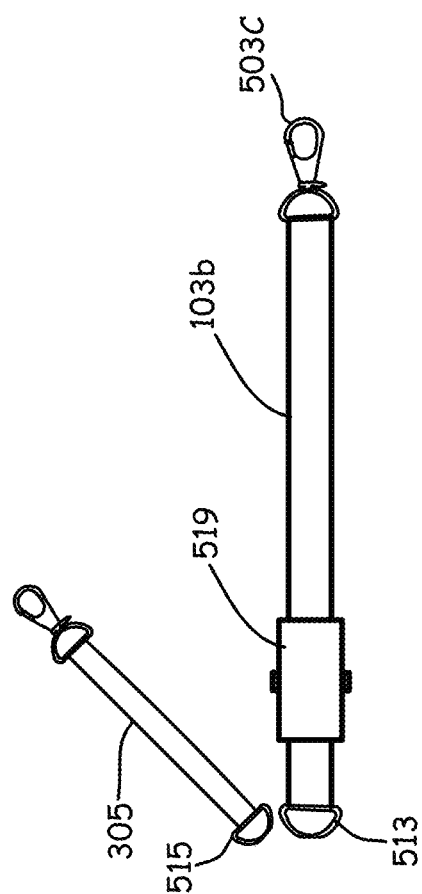

REDUCE PULL LEASH APPARATUS AND METHODS

The present application is a continuation-in-part of U.S. patent application Ser. No. 15/476,975, filed Apr. 1, 2017, which is hereby incorporated by reference herein in its entirety for all purposes.

FIELD

The present application relates to leashes for walking animals and more specifically to reduced pull leash apparatus and methods.

BACKGROUND

Dogs are wonderful companions and walking them can be a pleasant experience. For example, dogs provide a reason to get outside into nature, and are ideal walking or running partners.

A dog is typically walked on a leash that is connected to a collar placed around the dog's neck. Ideally, the leash is used to gently guide or direct the dog in a direction of travel. However, when a dog is untrained or gets excited, such as when the dog sees a squirrel or another dog, the dog may pull on the leash. This may result in the dog pulling, or even dragging, the person holding the dog's leash. This may be dangerous to both the dog and the person walking the dog. For example, the dog may be chocked by the collar and even may be injured. Likewise, the person walking the dog may be pulled off balance or knocked down. In some cases, the dog walker may suffer joint injuries from an unexpected pull and/or from multiple pulling events that occur over time. Example pull injuries include wrist, elbow and shoulder strains.

Methods and apparatus for reducing injuries to dogs and people who walk dogs are desired.

SUMMARY

In some embodiments of the invention, a reduced-pull leash device is provided for coupling to a leash. The reduced-pull leash device includes (1) a first leash section that is extendible, the first leash section having a length, a first end and a second end; and (2) a second leash section, the second leash section having a length, a first end and a second end. The length of the second leash section is longer than the length of the first leash section while the first leash section is unextended. The first end of the first leash section is configured to couple to or near the first end of the second leash section. The second end of the first leash section is configured to couple to a dog harness at a location on top of a dog. The second end of the second leash section is configured to couple to a dog harness at a front location of the dog. The length of the first leash section and the length of the second leash section are configured so that the first leash section extends when a dog pulls on the leash until the second leash section becomes taut. Once the second leash section becomes taut, a lateral force is generated at the front location of the dog by the second leash section so as to pull the dog laterally.

In some embodiments of the invention, a reduced-pull leash device is provided. The reduced-pull leash device includes (1) a first leash section that is extendible, the first leash section having a length, a first end and a second end; and (2) a leash having a plurality of mounting locations. The first end of the first leash section is configured to couple to one of the plurality of mounting locations of the leash so as to define a second leash section having a length and a first end and a second end, the first end located where the first end of the first leash section couples to the leash at one of the plurality of mounting locations. The length of the second leash section is longer than the length of the first leash section while the first leash section is unextended. The second end of the first leash section is configured to couple to a dog harness at a location on top of a dog. The second end of the second leash section is configured to couple to a dog harness at a front location of the dog. The length of the first leash section and the length of the second leash section are configured so that the first leash section extends when a dog pulls on the leash until the second leash section becomes taut. Once the second leash section becomes taut, a lateral force is generated at the front location of the dog by the second leash section so as to pull the dog laterally.

In some embodiments, a method of reducing pulling on a leash includes (1) providing a first leash section that is extendible, the first leash section having a length, a first end and a second end; and (2) providing a second leash section, the second leash section having a length, a first end and a second end. The length of the second leash section is longer than the length of the first leash section while the first leash section is unextended. The method further includes (3) coupling the first end of the first leash section to the leash at or near the first end of the second leash section; (4) coupling the second end of the first leash section to a dog harness at a location on top of a dog; and (5) coupling the second end of the second leash section to a dog harness at a front location of the dog. The length of the first leash section and the length of the second leash section are configured so that the first leash section extends when the dog pulls on the leash until the second leash section becomes taut. Once the second leash section becomes taut, a lateral force is generated at the front location of the dog by the second leash section so as to pull the dog laterally. The method further includes employing the second leash section to generate a lateral force on the front location of the dog during walking of the dog. Numerous other aspects are provided in accordance with these and other embodiments.

In some embodiments, a reduced-pull leash device for coupling to a leash includes (1) a first leash section that is extendible, the first leash section having a length, a first end and a second end; and (2) a second leash section, the second leash section having a length, a first end, a second end and a plurality of mounting locations. The length of the second leash section is longer than the length of the first leash section while the first leash section is unextended. The first end of the first leash section is configured to couple to one of the plurality of mounting locations of the second leash section. The second end of the first leash section is configured to couple to a dog harness at a location on top of a dog. The first end of the second leash section is configured to couple to a dog leash. The second end of the second leash section is configured to couple to a dog harness at a front location of the dog. The length of the first leash section and the length of the second leash section are configured so that the first leash section extends when a dog pulls on the leash until the second leash section becomes taut. Once the second leash section becomes taut, a lateral force is generated at the front location of the dog by the second leash section so as to pull the dog laterally.

In some embodiments, a reduced-pull leash system includes (1) a dog harness having at least one mounting location along a top region of the dog harness and plurality of mounting locations near a front region of the dog harness;

(2) a first leash section that is extendible, the first leash section having a length, a first end and a second end; and (3) a second leash section, the second leash section having a length, a first end and a second end. The length of the second leash section is longer than the length of the first leash section while the first leash section is unextended. The first end of the first leash section is configured to couple to or near the first end of the second leash section. The second end of the first leash section is configured to couple to the dog harness at the at least one mounting location along the top region of the dog harness. The second end of the second leash section is configured to couple to the dog harness at one of the plurality of mounting locations near the front region of the dog harness. The length of the first leash section and the length of the second leash section are configured so that the first leash section extends when a dog pulls on the leash until the second leash section becomes taught. Once the second leash section becomes taught, a lateral force is generated near the front of the dog by the second leash section so as to pull the dog laterally.

Other features and aspects of the present invention will become more fully apparent from the following detailed description, the appended claims and the accompanying drawings.

BRIEF DESCRIPTION OF THE DRAWINGS

FIG. 1G illustrates a simplified electrical circuit for providing one or more of an alarm, a vibration and/or a shock in response to the second leash section of the reduced-pull leash device becoming taut in accordance with embodiments of the present invention.

FIG. 2 is a schematic illustration of another alternative reduced-pull leash device provided in accordance with embodiments of the present invention.

FIGS. 3A and 3B are schematic illustrations of another alternative reduced-pull leash device provided in accordance with embodiments of the present invention.

FIG. 5A is a schematic illustration of another example reduced-pull leash assembly provided in accordance with embodiments herein.

FIG. 5B is a schematic representation of an example reduced-pull leash system that includes the reduced-pull leash assembly of FIG. 5A provided in accordance with the present invention.

FIG. 5C illustrates another example embodiment of a reduced-pull leash assembly provided in accordance with embodiments herein.

FIG. 5D illustrates another example embodiment of a reduced-pull leash assembly provided in accordance with embodiments herein.

DETAILED DESCRIPTION

In accordance with one or more embodiments provided herein, a leash device is provided that reduces the burden of walking a dog or other animal that pulls. In some embodiments, a reduced-pull leash device includes a first leash section that is extendible and that couples to a top portion of a dog harness, such as near a back region of a dog. The reduced-pull leash device also includes a second leash section that couples to a front portion of a dog harness, such as near a neck or side region of the dog. The first and second leash sections may also couple to and/or form part of a dog leash.

When a dog is using the reduced-pull leash device, the first leash section extends when the dog begins to pull on the dog leash. At this stage, the dog feels pulling along its back due to the first leash section. The first leash section extends until the second leash section becomes taut. Once the second leash section becomes taut, a lateral force is generated at the front location of the dog because of the pull on the second leash section. The lateral force at or near the front region of the dog causes the dog to be pulled sideways and/or rotate. The harder the dog pulls, the more the dog rotates. This makes it much harder for the dog to pull the person holding the dog leash. The lateral and/or rotational force has been found to discourage a dog from pulling, and to train the dog to stop pulling once it feels the first leash section extending or stop extending. Numerous other embodiments are provided. These and other embodiments are described further below with reference to FIGS. 1A-6C.

Figure 1A:
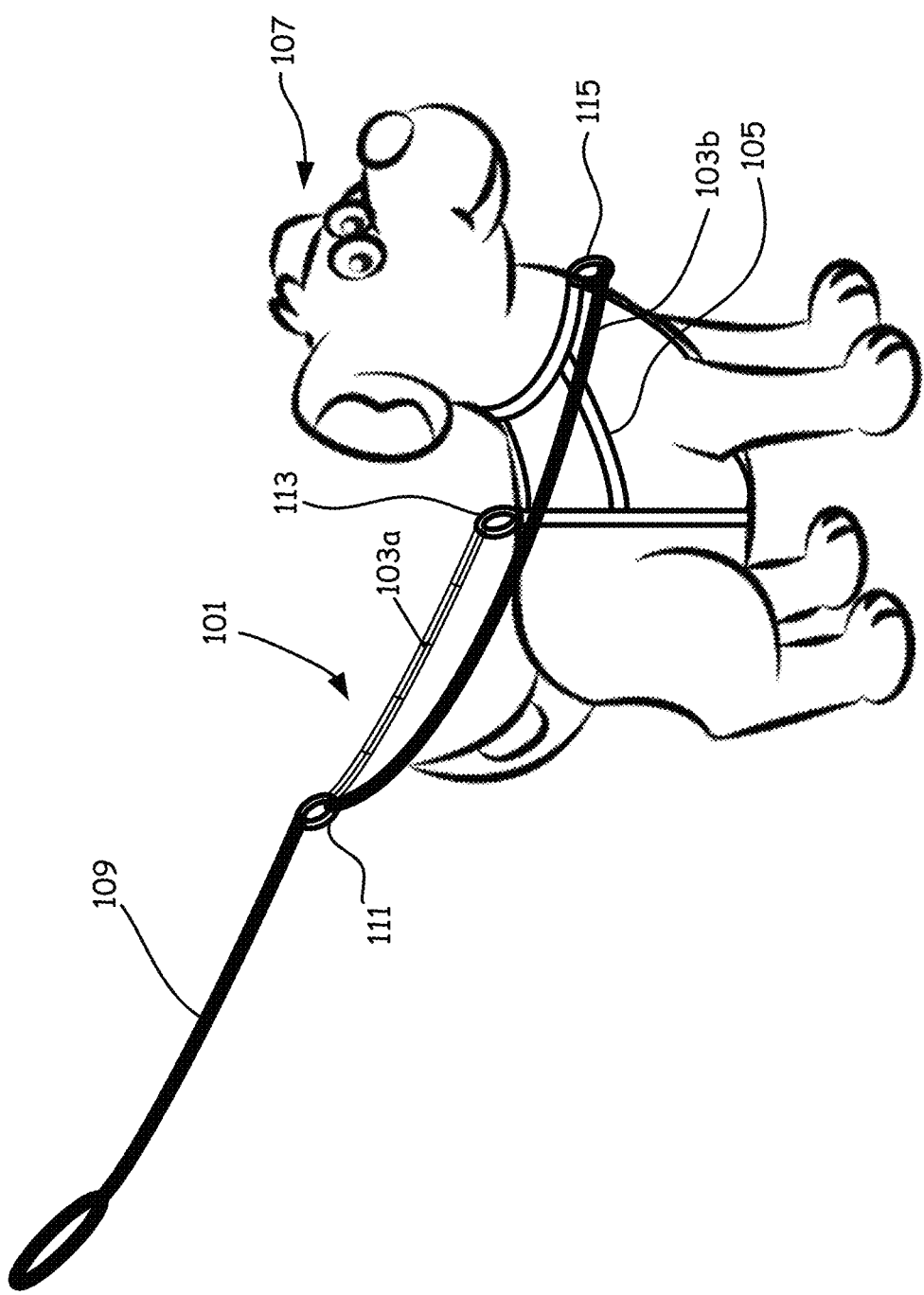
FIGS. 1A and 1B are schematic representations of a reduced-pull leash device provided in accordance with embodiments of the present invention.

FIG. 1A is a schematic representation of a reduced-pull leash device 101 provided in accordance with the present invention. The reduced-pull leash device 101 includes a first leash section 103a that is extendible and that couples to a top portion of a dog harness 105, such as near a back region of a dog 107. The reduced-pull leash device 101 also includes a second leash section 103b, that in some embodiments is of a fixed length (e.g., is not extendible), and that couples to a front portion of the dog harness 105, such as near a neck region of the dog 107. The first and second leash sections 103a, 103b also couple to a dog leash 109. The dog harness 105 may be any conventional dog harness. The dog leash 109 may be any conventional dog leash such as a fixed length or retractable dog leash.

The first leash section 103a may be formed of any extendible, stretchable and/or expandable material such as a natural or synthetic rubber, neoprene, or the like. In some embodiments, the first leash section 103a may include one or more bungee cords. The second leash section 103b may be formed from leather, nylon, chain, cable or any other suitable material that is sufficient in strength to not break when pulled on by a dog or other animal to be walked.

In some embodiments, a first end of the first leash section 103a and a first end of the second leash section 103b may couple to a ring, carabiner, hook or similar device 111, which may also couple to the leash 109. A second end of the first leash section 103a may couple to the dog harness 105 at a back region of the dog 107, such as with a ring, carabiner, hook or similar device 113. A second end of the second leash section 103b may couple to the dog harness 105 at a neck region of the dog 107, such as with a ring, carabiner, hook or similar device 115. Other coupling devices and/or locations may be used.

Figure 1B:
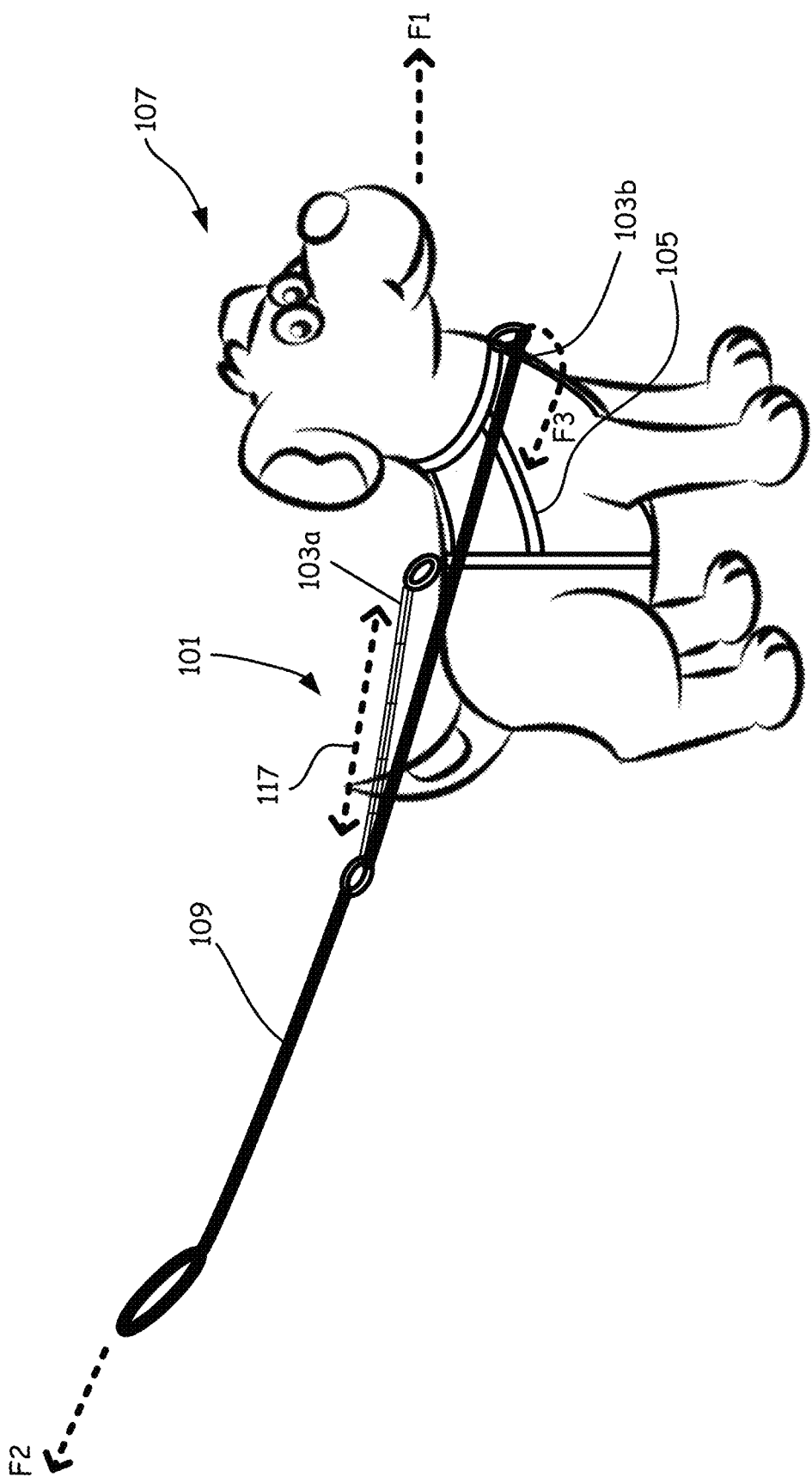
Figure 6F:
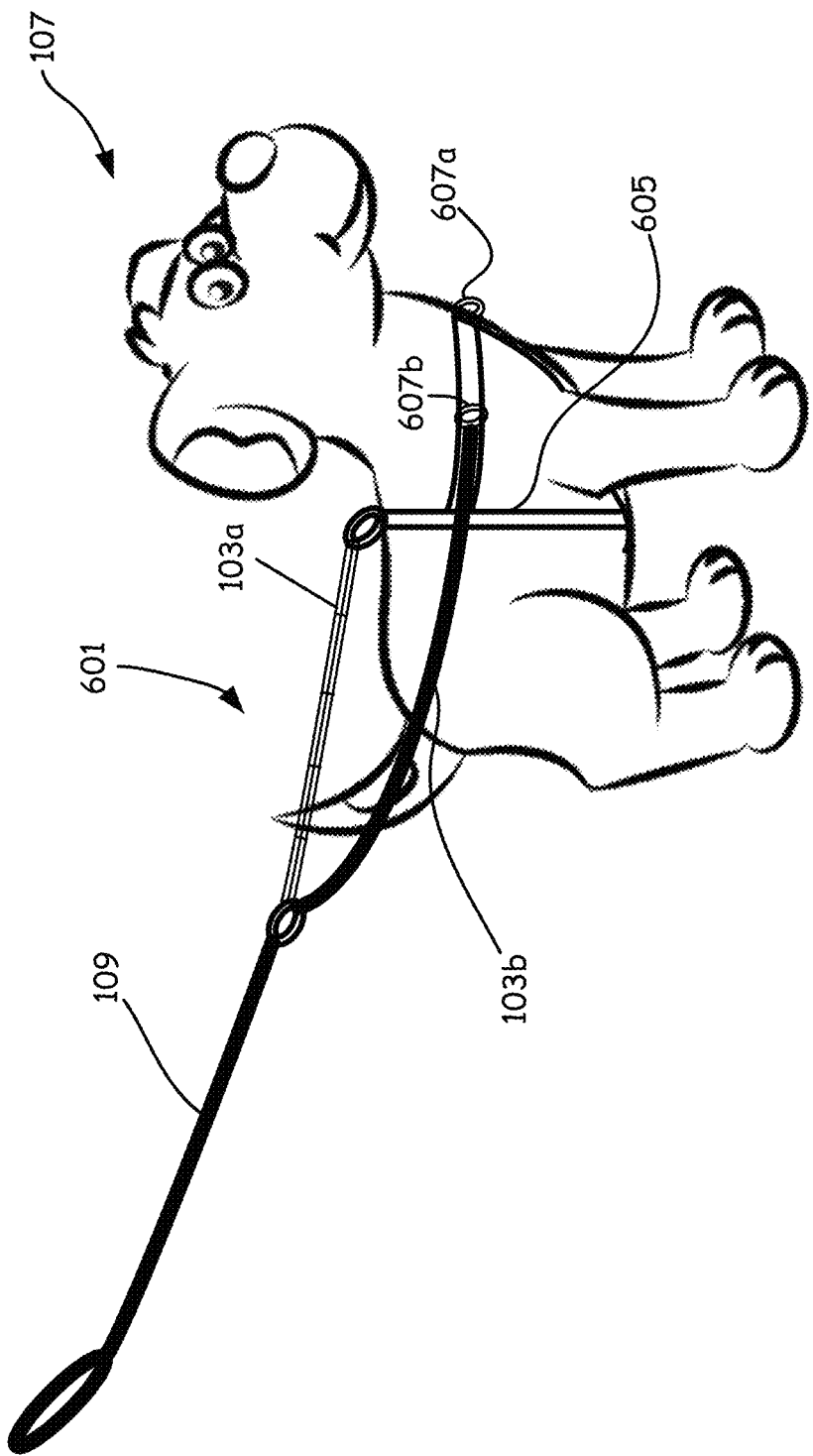
FIG. 6A is a schematic representation of another example reduced-pull leash device provided in accordance with another embodiment of the present invention.
FIG. 6B is a top schematic illustration of the forces generated on a dog by the reduced-pull leash device of FIG. 6A provided in accordance with embodiments of the present invention.
FIG. 6C is a schematic representation of a reduced-pull leash system that includes reduced-pull leash device of FIG. 6A provided in accordance with the present invention.

The length of the first leash section 103a and the length of the second leash section 103b are configured so that the first leash section 103a extends and/or expands when a dog pulls on the dog leash 109 until the second leash section 103b becomes taut. Once the second leash section 103b becomes taut, a lateral force is generated at the front location (neck region as shown in FIG. 1B, or side-shoulder region as shown in FIG. 6A) of the dog 107 so as to pull the dog laterally. For example, as shown in FIG. 1B, as the dog 107 pulls forward with a force F1, the person (not shown) walking the dog 107, exerts an opposite force F2 to stop the dog 107 from moving forward. In response to these oppositely directed forces F1 and F2, the first leash second 103a is stretched and extends as indicated by double arrow 117.

First leash section 103a expands until second leash section 103b becomes taut. At this point, any additional force from the person walking the dog 107 creates a lateral and/or rotational force F3 that causes the dog 107 to be pulled laterally as the dog 107 tries to pull forward. The harder the dog 107 pulls, the more the dog 107 rotates. This makes it much harder for the dog 107 to pull the person walking the dog 107. The lateral and/or rotational force has also been found to discourage the dog 107 from pulling, and to train the dog 107 to stop pulling once it feels the first leash section 103a extending or stop extending.

Figure 1C:
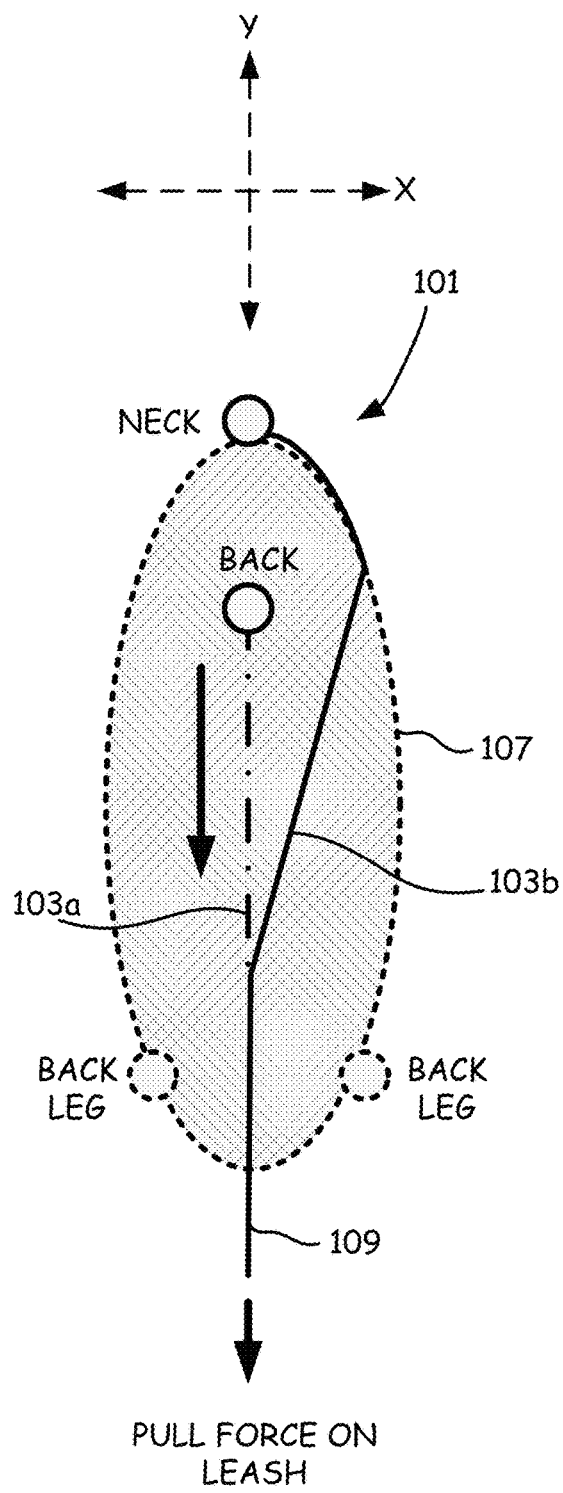
FIGS. 1C and 1D are top schematic illustrations of the forces generated on a dog by the reduced-pull leash device provided in accordance with embodiments of the present invention.
Figure 1D:
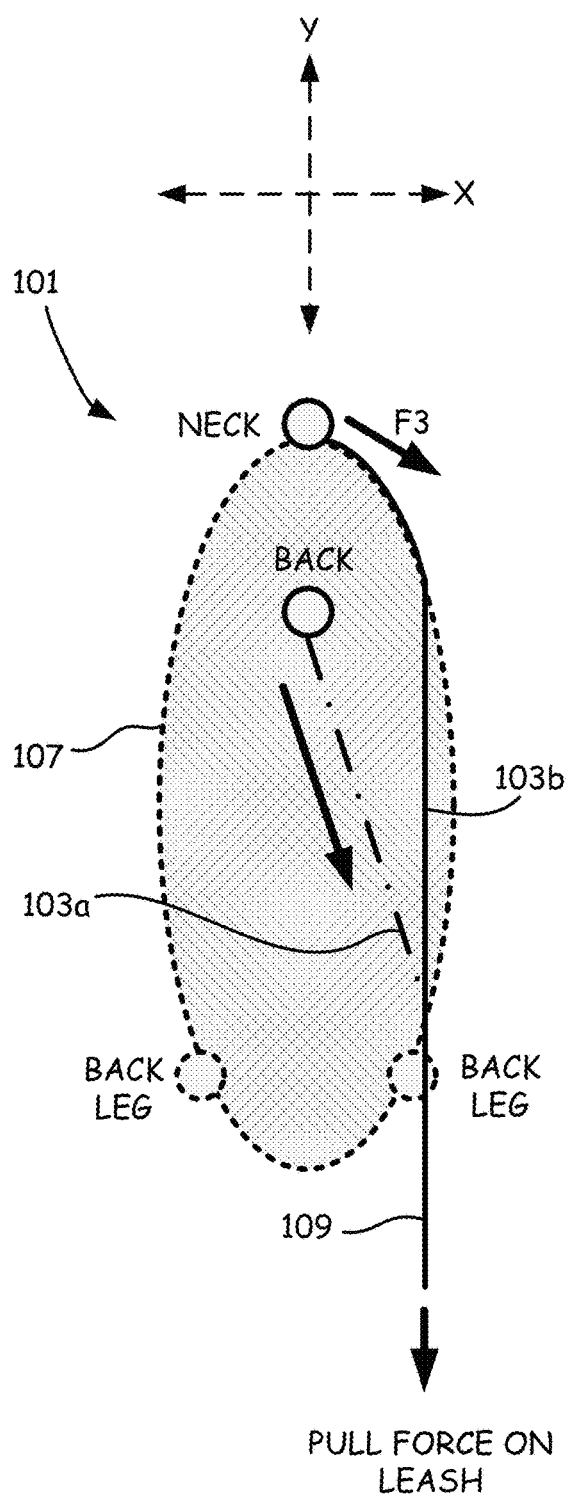

FIGS. 1C and 1D are top schematic illustrations of the forces generated on the dog 107 by the reduced-pull leash device 101 provided in accordance with embodiments of the present invention. As shown in FIG. 1C, when the dog 107 initially pulls on the leash 109, section 103a begins to extend and the force exerted by the dog 107 pulling forwarded is directed through first leash section 103a primarily in-line with the dog 107 (e.g., along the y-axis in FIG. 1C). Once the dog 107 pulls hard enough that the first leash section 103a extends to a point at which the second leash section 103b becomes taut, the second leash section 103b pulls the dog 107 in both a backward (y-axis) and lateral (x-axis) direction as shown by arrow (force) F3.

The force F3 pulls the dog 107 laterally and causes the dog 107 to pivot because the back legs of the dog 107 become fixed pivot positions about which the dog 107 can rotate due to the lateral (x-axis) force component of force F3. The harder the dog 107 pulls, the more the dog 107 is pulled sideways or rotates. As mentioned, this makes it much harder for the dog 107 to pull the person walking the dog 107. It has also been found to discourage the dog 107 from pulling and to train the dog 107 to stop pulling once it feels the first leash section 103a extending or stop extending.

Figure 1E:
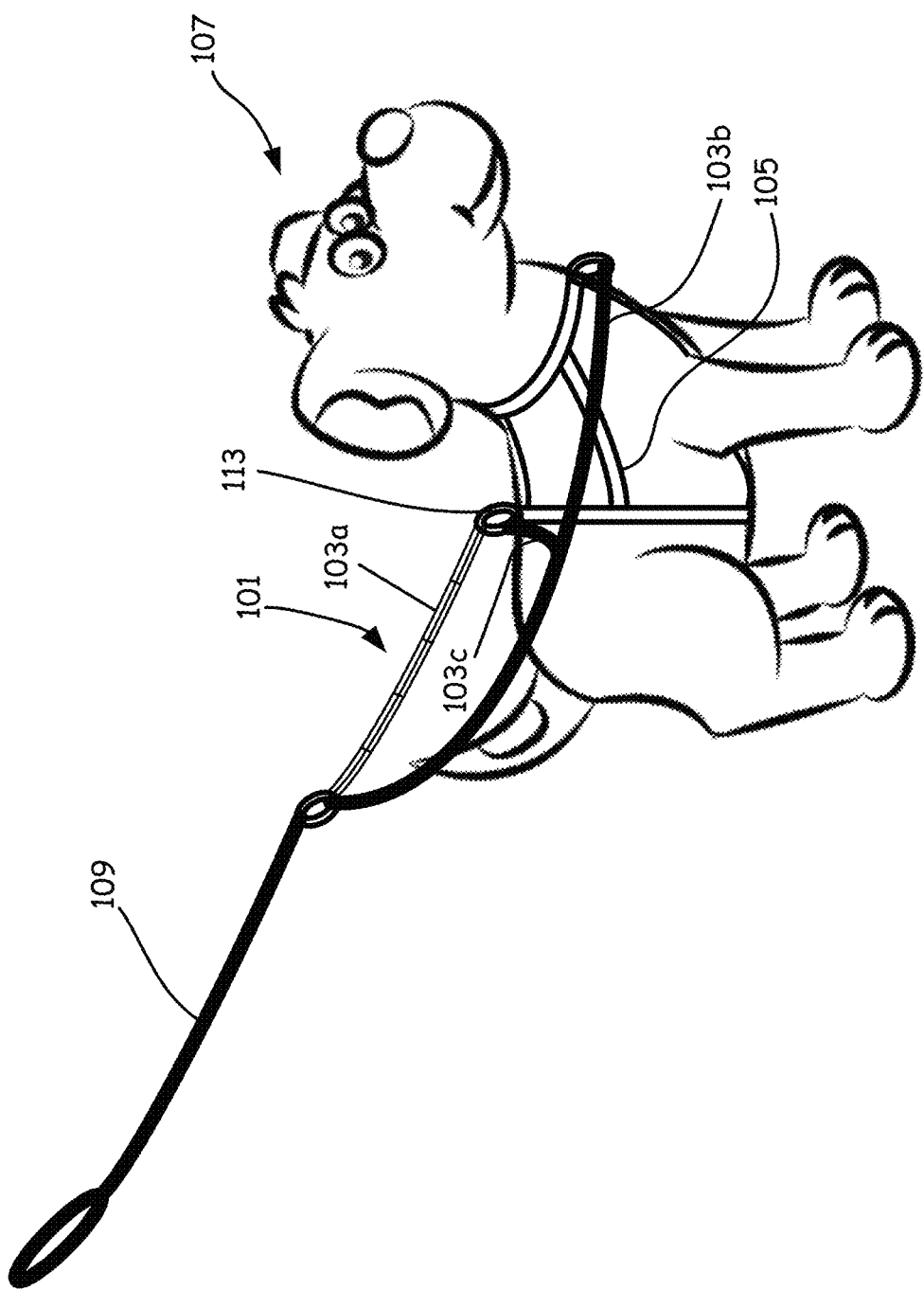
FIG. 1E is an alternative embodiment of the reduced-pull leash device in which the second leash section is coupled to a harness and/or the first leash section with an additional leash section in accordance with embodiments of the present invention.

FIG. 1E is an alternative embodiment of the reduced-pull leash device 101 in which the second leash section 103b is coupled to the harness 105 and/or the first leash section 103a with an additional leash section 103c. The additional leash section 103c may be of a fixed length or extendible and is used to prevent the dog 107 from becoming tangled in the second leash section 103b when the second leash section 103b is loose (not taut). The additional leash section 103c may be made from the same material as the first leash section 103a, the second leash section 103b, or from any other suitable material. The additional leash section 103c may be coupled to the harness 105, the first section 103a, the coupling device 113 or another other suitable location.

Figure 1F:
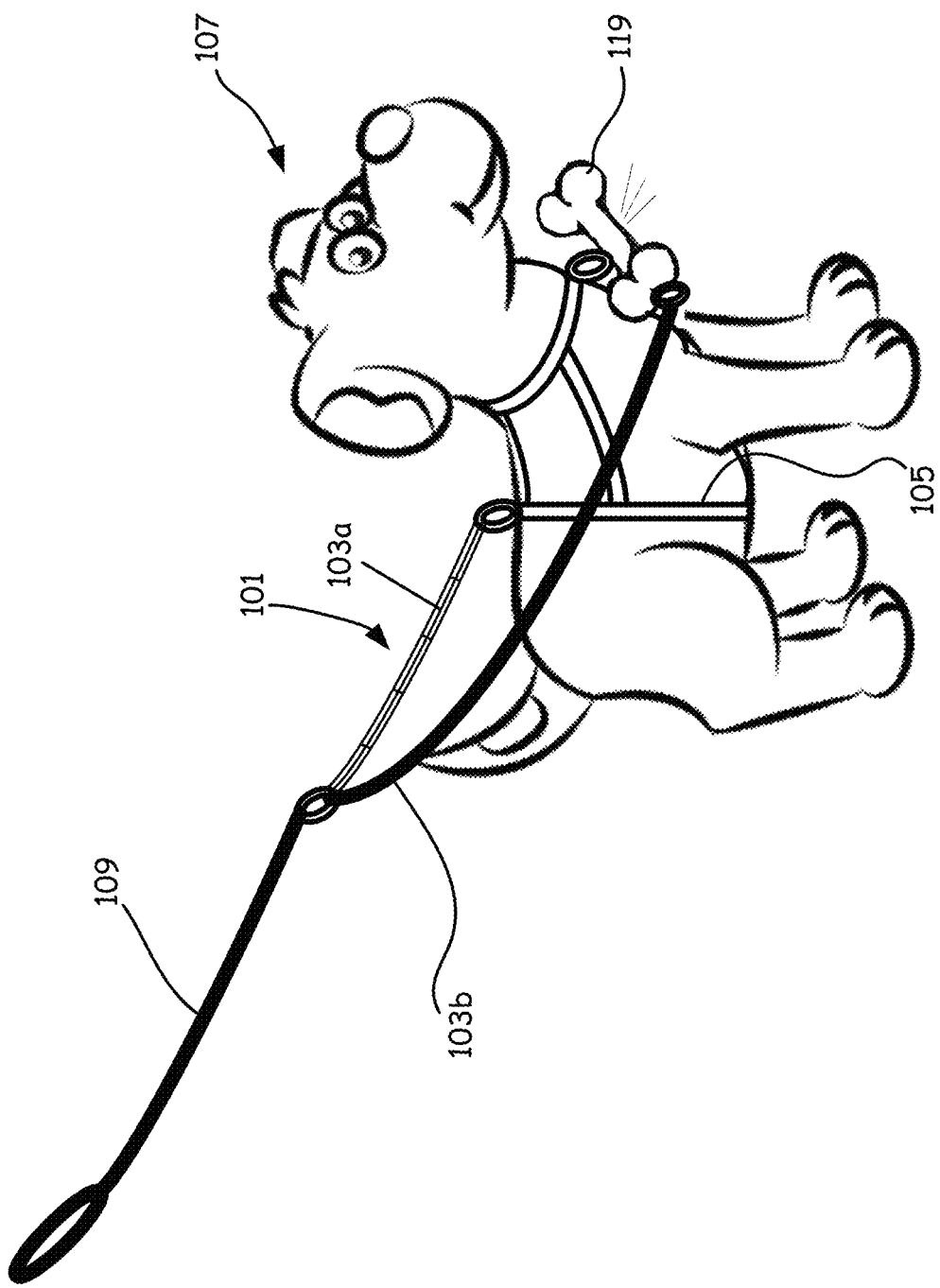
FIG. 1F is an alternative embodiment of the reduced-pull leash device in which the second leash section is coupled to the neck region of a harness with an additional mounting piece in accordance with embodiments of the present invention.
Figure 16:
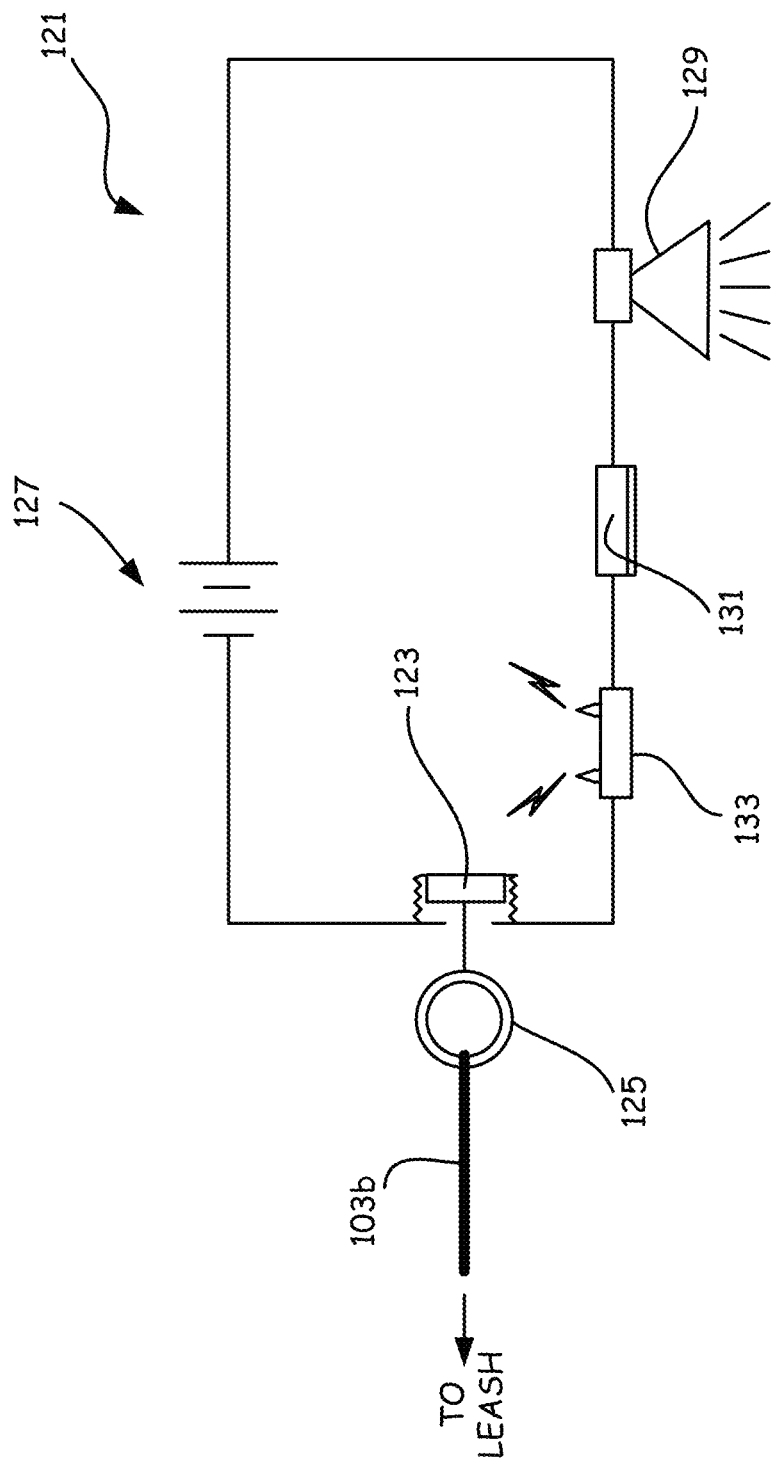

FIG. 1F is an alternative embodiment of the reduced-pull leash device 101 in which the second leash section 103b is coupled to the neck region of the harness 105 with an additional mounting piece 119. The additional mounting piece 119 is designed to increase the rotational torque exerted on the dog 107 by the second leash section 103b during pulling by the dog 107. In particular, the additional mounting piece 119 moves the connection point of the second leash section 103b laterally from the harness 105 in the neck region of the dog 107. In some embodiments, the additional mounting piece 119 may include an alarm (not separately shown in FIG. 1F) that generates a sound when the second leash section 103b is taut and pulls on the additional mounting piece 119 with greater than a predetermined force. Additionally or alternatively, the additional mounting piece 119 may vibrate and/or shock the dog 107 when the second leash section 103b becomes taut and pulls on the additional mounting piece 119 with greater than a predetermined force. For example, FIG. 1G illustrates a simplified electrical circuit 121 for providing one or more of an alarm, a vibration and/or a shock in response to the second leash section 103b becoming taut. With reference to FIG. 1G, the second leash section 103b may be coupled to a spring activated switch 123 (e.g., via a coupling 125) that closes electrical circuit 121 when the switch 123 is pulled with a predetermined force or greater by the second leash section 103b. Closing the electrical circuit 121 causes a battery 127 to deliver electrical energy to one or more of an alarm 129, a vibration mechanism 131 and/or an electrical shock mechanism 133 to provide one more of an auditory warning, a vibration or a shock to dog 107 to warn dog 107 to stop pulling. This switch 123 may release (e.g., under spring action) and open the electrical circuit 121 when the dog 107 stops pulling so as to stop the alarm, vibration and/or shock. The alarm, vibration and/or shock may therefore be "pull-activated." In at least one embodiment, one or both ends of the additional mounting piece 119 may be coupled to the dog harness 105 to improve stability, such as via one or more straps (not shown) extending between the ends of the additional mounting piece 119 and dog harness 105 (e.g., near the coupling device 113 (FIG. 1E) or another suitable location).

In some embodiments, the lengths of the first and second leash sections 103a, 103b are selected so that the first leash section 103a extends when a dog pulls on the dog leash 109 until the second leash section 103b becomes taut as shown in FIG. 1B, for example. The length of the first leash section 103a may depend on many factors such as the size of the dog 107, how long a user wants the reduced-pull leash device 101 to be as the length of first leash section 103a effectively increases the length of the leash 109, the position of the coupling fastener 113 relative to the coupling fastener 115, how much the first leash section 103a extends, etc. Similarly, the length of the second leash section 103b may depend on many factors such as the size of the dog 107, how much force a user wants to exert before the second leash section 103b becomes taut, the position of the coupling fastener 113 relative to the coupling fastener 115, how much the first leash section 103a extends, etc. In some embodiments, the first leash section 103a may be about ½ to about ¾ of the length of the second leash section 103b. In one particular embodiment, the first leash section 103a may be about 4-15 inches, and in some embodiments about 7-12 inches, and the second leash section 103b may be about 14-30 inches, and in some embodiments about 16-25 inches. Other first and/or second leash section lengths may be used.

In some embodiments, the length of the first leash section 103a and/or the length of the second leash section 103b may be adjustable, such as by using an adjustable length strap slider or similar mechanism (as shown, for example, in FIGS. 5A-5B).

FIG. 2 is a schematic illustration of another alternative reduced-pull leash device 201 provided in accordance with embodiments herein. With reference to FIG. 2, the reduced-pull leash device 201 includes a first leash section 103a having a first quick release 203a and a second quick release 203b. For example, the first and second quick releases 203a, 203b may be carabiners, quick release helmet fasteners or the like. Use of quick releases 203a, 203b allows different length and/or elasticity first leash sections 103a to be easily used. The second leash section 103b similarly may include a quick release 205 for coupling to the harness 105 (and/or to the leash 109).

FIG. 3A is a schematic illustration of another alternative reduced-pull leash device 301 provided in accordance with embodiments herein. With reference to FIG. 3A, in the reduced-pull leash device 301, the second leash section 103b is formed from the leash 109. For example, a mounting ring 303 or other coupling may be attached to the leash 109 via a strap 305 or other material to define a desired length for the second leash section 103b. The first leash section 103a may couple to the mounting ring 303 as shown, for example.

In some embodiments, the second leash section 103b and/or the leash 109 may be provided with mounting locations 307 (FIG. 3B) that allow the mounting ring 303 to be coupled at any desired location along leash 109. This allows for easy adjustment of the length of the second leash section 103b relative to the first leash section 103a. Any suitable mounting mechanism may be used to couple the strap 305 to the leash 109 (e.g., snaps, plugs, etc.). In other embodiments, the first leash section 103a may couple directly to any of the mounting locations 307 (e.g., without the mounting ring 303) to set a desired length of the first leash section 103a relative to the second leash section 103b.

As stated, the mounting locations 307 may be formed in the leash 109, the second leash section 103b or both. In some embodiments, the second leash section 103b is created by attaching the first leash section 103a to one of the mounting locations 307 of the leash 109 (so as to define the second leash section 103b and its length).

Figure 4:
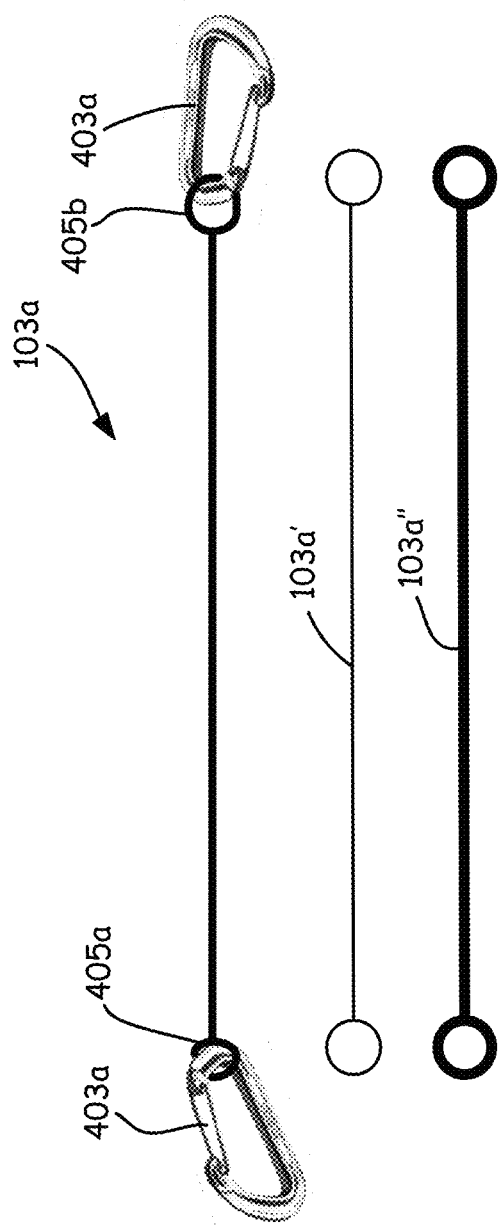
FIG. 4 is a schematic illustration of another alternative first leash section provided in accordance with embodiments of the present invention.

FIG. 4 is a schematic illustration of another alternative first leash section 103a provided in accordance with embodiments herein. With reference to FIG. 4, the first leash section 103a is coupled to a first quick release 403a and a second quick release 403b. For example, the first and second quick releases 403a, 403b may be carabiners, quick release helmet fasteners or the like. Use of quick releases 403a, 403b allows different length and/or elasticity first leash sections to be easily used. In the embodiment shown, the first leash section 103a includes looped ends 405a, 405b that allow the first leash section 103a to be quickly attached to or removed from the quick releases 403a, 403b. Additional first leash sections of different thicknesses and/or elasticities may be used for or added to the first leash section 103a. For example, FIG. 4 illustrates first leash sections 103a' and 103a" which have different thicknesses and which may be used in place of or in addition to the first leash section 103a. In this manner, the length of the first leash section 103a may be changed, or the amount of force required to stretch the first leash section 103a may be increased or decreased as desired.

FIG. 5A is a schematic illustration of a reduced-pull leash assembly 501 provided in accordance with embodiments herein. With reference to FIG. 5A, in the reduced-pull leash assembly 501, the first leash section 103a may couple to the second leash section 103b via quick release 503a or another connector. For example, second leash section 103b may be provided with mounting locations 307 that allow the quick release 503a, and thus first leash section 103a, to be coupled at any desired location along second leash section 103b. A second quick release 503b allows first leash section 103a to be coupled to an upper portion of a harness 105 (e.g. behind a dog's neck such as above the dog's shoulder blades), and a third quick release 503c allows second leash section 103b to be coupled to harness 105 (e.g., near a front or side region of the dog).

FIG. 5B is a schematic representation of a reduced-pull leash system 509 that includes reduced-pull leash assembly 501 of FIG. 5A provided in accordance with the present invention. Reduced pull leash system 509 includes a leash 511 coupled to a mounting location 513 (e.g., a mounting ring or similar mounting device) on second leash section 103b. Leash 511 may be any suitable leash such as a fixed length leash, an adjustable length leash, a retractable leash (as shown) or the like. As mentioned, first leash section 103a may be formed of any extendible, stretchable and/or expandable material such as a natural or synthetic rubber, neoprene, or the like. In some embodiments, the first leash section 103a may include one or more bungee cords. The second leash section 103b may be formed from leather, nylon, chain, cable or any other suitable material that is sufficient in strength to not break when pulled on by a dog or other animal to be walked. In some embodiments, second leash section 103b may be formed of the same material as the first leash section 103a, but less extendible, stretchable and/or expandable. For example, second leash section 103b may be formed of a thicker material that is more difficult to stretch or may otherwise have other stretching characteristics (e.g., the first leash section 103a may stretch by 100-200% while the second leash section 103b may stretch by 20%-50%). Stretching by 100% means doubling in length (e.g., if the original leash section is 5 inches, when stretched by 100%, the leash section will be approximately 10 inches in length). In one particular embodiment, first leash section 103a may stretch by 150-200% while second leash section 103b may stretch by 100% or less. Other stretch amounts may be used for either leash section.

In some embodiments, first leash section 103a may be fixedly or removably coupled to mounting location 513 of second leash section 103b rather than to one of mounting locations 307 (e.g., and/or second leash section 103b may not include mounting locations 307). For example, FIG. 5C illustrates an embodiment of reduced-pull leash assembly 501 in which first leash section 103a may couple to either mounting location 513 of second leash section 103b or directly to leash 511 (not shown) using a mounting ring 515 or other mounting mechanism, for example.

In the embodiment shown in FIG. 5C, second leash section 103b may be of a fixed length or of an adjustable length (as shown). For example, second leash section 103b may include a strap slider 517 or similar mechanism that allows second leash section 103b to be shortened or lengthened as desired. In the embodiment shown in FIG. 5D, second leash section 103b includes a retraction device 519 that retracts leash section 103b when it is not being pulled on by leash 511. This may help prevent a dog from becoming tangled in second leash section 103b when the dog is not pulling on leash 511. Any suitable retraction device 519 may be used (e.g., a spring-biased retraction device used for retracting telephone cords or vacuum cleaner power cords, a coiled cord similar to those used with telephone handsets, or the like).

FIG. 6A is a schematic representation of a reduced-pull leash device 601 provided in accordance with another embodiment of the present invention. The reduced-pull leash device 601 includes first leash section 103a that is extendible and that couples to a top portion of a dog harness 605, such as near a back region of dog 107 (e.g., near the shoulder blades of the dog). The reduced-pull leash device 601 also includes second leash section 103b, that in some embodiments is of a fixed or adjustable length, and that couples to a front portion of the dog harness 605, such as near a neck or front-side region of the dog 107. The first and second leash sections 103a, 103b also couple to dog leash 109. The dog leash 109 may be any conventional dog leash such as a fixed length or retractable dog leash. Harness 605 may include multiple coupling locations (only mounting locations 607a, 607b are shown in FIG. 6A) for second leash section 103b (as described further below with regarding to FIG. 6C).

In some embodiments, the first leash section 103a may be formed of any extendible, stretchable and/or expandable material such as a natural or synthetic rubber, neoprene, or the like. In some embodiments, the first leash section 103a may include one or more bungee cords. The second leash section 103b may be, in some embodiments, formed from leather, nylon, chain, cable or any other suitable material that is sufficient in strength to not break when pulled on by a dog or other animal to be walked.

In some embodiments, a first end of the first leash section 103a and a first end of the second leash section 103b may couple to a ring, carabiner, hook or similar device 111, which may also couple to the leash 109. A second end of the first leash section 103a may couple to the dog harness 605 at a back region of the dog 107, such as with a ring, carabiner, hook or similar device. A second end of the second leash section 103b may couple to the dog harness 605 at a neck region or front-side region of the dog 107, such as with a ring, carabiner, hook or similar device. Other coupling devices and/or locations may be used.

Figure 6B:
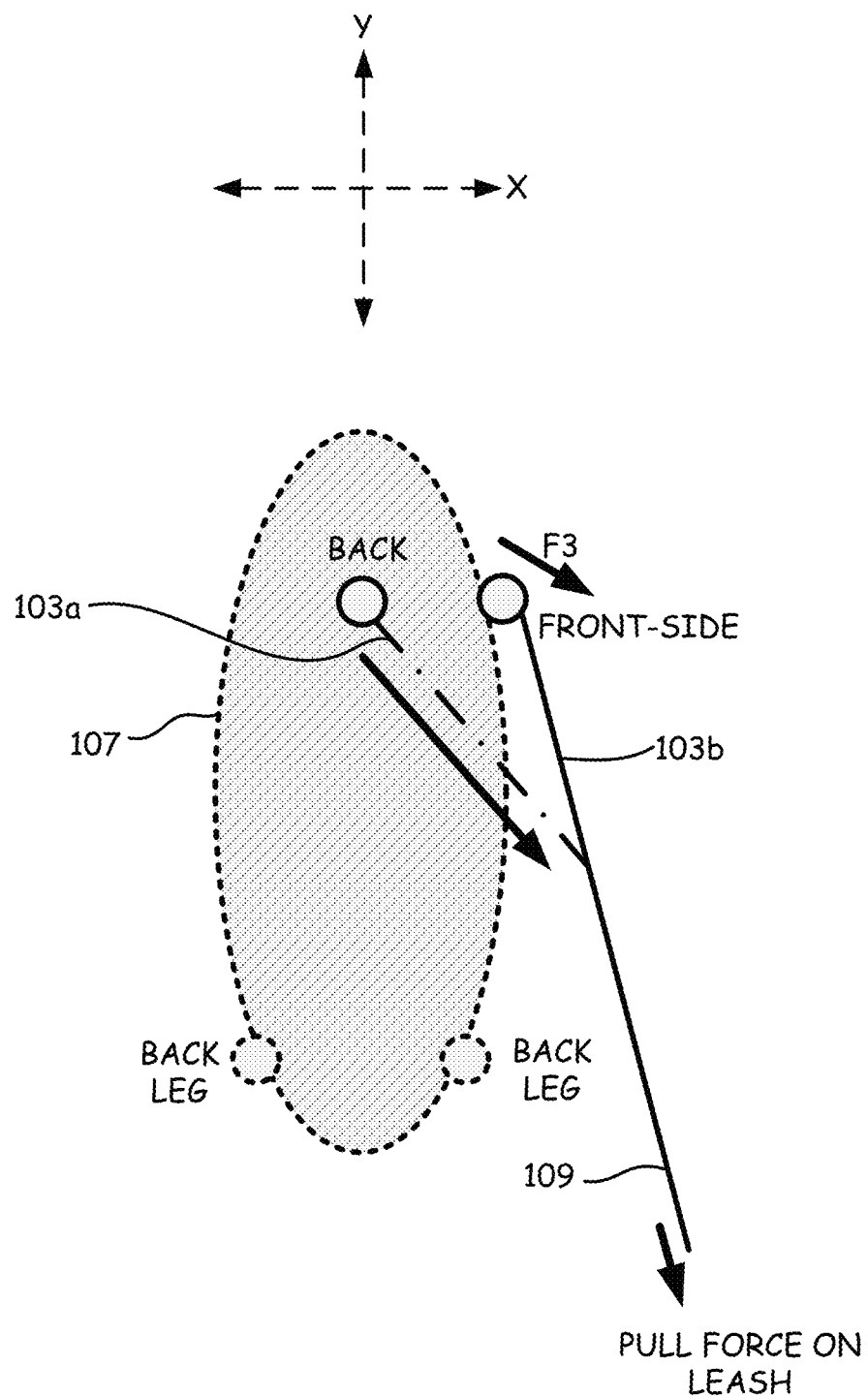

The length of the first leash section 103a and the length of the second leash section 103b are configured so that the first leash section 103a extends and/or expands when a dog pulls on the dog leash 109 until the second leash section 103b becomes taut. Once the second leash section 103b becomes taut, a lateral force is generated at the front location (neck region as shown in FIG. 1C, or side-shoulder region as shown in FIG. 6B) of the dog 107 so as to pull the dog laterally.

First leash section 103a expands until second leash section 103b becomes taut. At this point, any additional force from the person walking the dog 107 creates a lateral and/or rotational force F3 that causes the dog 107 to be pulled laterally as the dog 107 tries to pull forward. The harder the dog 107 pulls, the more the dog 107 rotates. This makes it much harder for the dog 107 to pull the person walking the dog 107. The lateral and/or rotational force has also been found to discourage the dog 107 from pulling, and to train the dog 107 to stop pulling once it feels the first leash section 103a extending or stop extending.

Figure 6C:
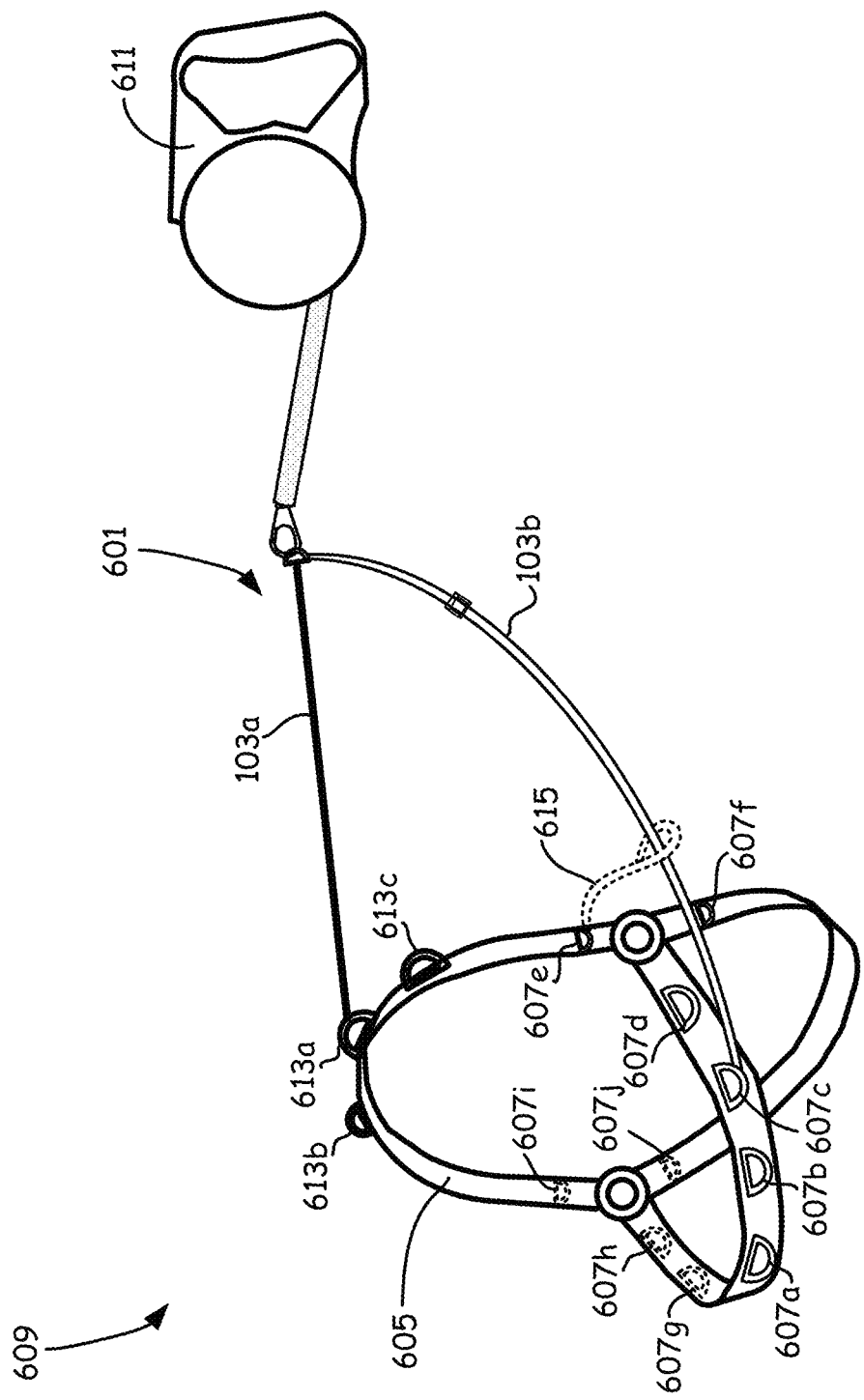

FIG. 6C is a schematic representation of a reduced-pull leash system 609 that includes reduced-pull leash device 601 of FIG. 6A provided in accordance with the present invention. Reduced pull leash system 609 includes a leash 611 coupled to first leash section 103a and second leash section 103b. (First leash section 103a may be coupled directly to leash 611 or coupled to second leash section 103b which in turn is coupled to leash 611.) Leash 611 may be any suitable leash such as a fixed length leash, an adjustable length leash, a retractable leash (as shown) or the like. As mentioned, first leash section 103a may be formed of any extendible, stretchable and/or expandable material such as a natural or synthetic rubber, neoprene, or the like. In some embodiments, the first leash section 103a may include one or more bungee cords. The second leash section 103b may be formed from leather, nylon, chain, cable or any other suitable material that is sufficient in strength to not break when pulled on by a dog or other animal to be walked. In some embodiments, second leash section 103b may be formed of the same material as the first leash section 103a, but less extendible, stretchable and/or expandable, as previously described. For example, second leash section 103b may be formed of a thicker material that is more difficult to stretch or may otherwise have other stretching characteristics (e.g., the first leash section 103a may stretch by 100-200% while the second leash section 103b may stretch by 20%-50%). In one particular embodiment, first leash section 103a may stretch by 150-200% while second leash section 103b may stretch by 100% or less. Other stretch amounts may be used for either leash section. Alternatively, second leash section 103b may be of a fixed length or of an adjustable in length. In some embodiments, second leash section 103b may include a retraction device 519 that retracts leash section 103b when it is not being pulled on by leash 611.

Reduced-pull leash system 609 includes harness 605 which includes additional attachment locations 607a-j for second leash section 103b. Each attachment location 607a-j may include a hole, loop, mounting ring or the like for attaching second leash section 103b. Any number of attachment locations may be provided (e.g., 1, 2, 3, 4, 5, 6, 7, 8, 9, 10, etc.). Harness 605 also includes one or more attachment locations 613a-b for first leash section 103a. Each attachment location 613a-c may include a hole, loop, mounting ring or the like for attaching first leash section 103a. Any number of attachment locations may be provided (e.g., 1, 2, 3, 4, 5, etc.).

In some embodiments, a support strap 615 may be provided that couples between one of the attachment locations 607a-j or 613a-c and second leash section 103b to keep second leash section 103b from becoming tangled or tripping a dog wearing harness 605. Support strap 615 may be made of any suitable material, such as natural or synthetic rubber, neoprene leather, nylon, chain, cable, or the like. In some embodiments, support strap 615 may be adjustable in length (e.g., via a slider strap, a retraction device, or the like). Harness 605 may be formed from nylon, leather or another suitable material.

The foregoing description discloses only example embodiments of the invention. Modifications of the above disclosed apparatus and methods which fall within the scope of the invention will be readily apparent to those of ordinary skill in the art. For example, the second leash section 103b may be of a fixed length or, in some embodiments, extendible but requiring more force than the first leash section 103a to extend. In such cases, the second leash section 103b may be formed from natural or synthetic rubber, neoprene, or the like, for example. In one particular example, the first and second leash sections 103a, 103b may be formed from the same material but the second leash section 103b may be thicker than the first leash section 103*a* so as to require more force to extend. While described primarily with regard to dogs, it will be understood that the reduced-pull leash device described herein may be employed with other animals.

Accordingly, while the present invention has been disclosed in connection with the example embodiments thereof, it should be understood that other embodiments may fall within the spirit and scope of the invention, as defined by the following claims.

The invention claimed is:

1. A reduced-pull leash device for coupling to a leash comprising:
   a first leash device section that is extendible, the first leash device section having a length, a first end and a second end; and
   a second leash device section, the second leash device section having a length, a first end, a second end and one or more mounting locations;
   wherein the length of the second leash device section is longer than the length of the first leash device section while the first leash device section is unextended;
   wherein the first end of the first leash device section is configured to couple to one of the mounting locations of the second leash device section;
   wherein the second end of the first leash device section is configured to couple to a dog harness at a location on top of a dog;
   wherein the first end of the second leash device section is configured to couple to a dog leash;
   wherein the second end of the second leash device section is configured to couple to a dog harness at a front location of the dog;
   wherein the length of the first leash device section and the length of the second leash device section are configured so that the first leash device section extends when a dog pulls on the leash until the second leash device section becomes taut; and
   wherein once the second leash device section becomes taut, a lateral force is generated at the front location of the dog by the second leash device section so as to pull the dog laterally.

2. The leash device of claim 1 wherein the second leash device section is not extendible.

3. The leash device of claim 1 wherein the second leash device section is extendible but requires more force than the first leash device section to extend.

4. The leash device of claim 1 further comprising a third leash device section, the third leash device section having a first end and a second end, wherein the first end of the third leash device section couples to or near the first end of the first leash device section and the second end of the third leash device section couples to the second leash device section.

5. The leash device of claim 1 wherein the first leash device section includes at least one bungee cord.

6. The leash device of claim 1 further comprising an additional mounting piece that couples between the dog harness and the second end of the second leash device section so as to increase the rotational torque exerted on the dog by the second leash device section during pulling by the dog.

7. The leash device of claim 6 wherein the additional mounting piece includes a pull-activated alarm.

8. The leash device of claim 6 wherein the additional mounting piece includes a pull-activated vibration mechanism.

9. The leash device of claim 6 wherein the additional mounting piece includes a pull-activated shock mechanism.

10. The leash device of claim 1 wherein the second leash device section includes a plurality of mounting locations.

11. The leash device of claim 1 wherein the second leash device section is adjustable in length.

12. The leash device of claim 11 wherein the second leash device section includes a strap slider.

13. The leash device of claim 1 wherein the second leash device section includes a retraction device.

14. A reduced-pull leash device for coupling to a leash comprising:
   a first leash device section that is extendible, the first leash device section having a length, a first end and a second end; and
   a second leash device section, the second leash device section having a length, a first end, a second end and a plurality of mounting locations;
   wherein the length of the second leash device section is longer than the length of the first leash device section while the first leash device section is unextended;
   wherein the first end of the first leash device section is configured to couple to one of the plurality of mounting locations of the second leash device section;
   wherein the second end of the first leash device section is configured to couple to a dog harness at a location on top of a dog;
   wherein the first end of the second leash device section is configured to couple to a dog leash;
   wherein the second end of the second leash device section is configured to couple to a dog harness at a front location of the dog;
   wherein the length of the first leash device section and the length of the second leash device section are configured so that the first leash device section extends when a dog pulls on the leash until the second leash device section becomes taut; and
   wherein once the second leash device section becomes taut, a lateral force is generated at the front location of the dog by the second leash device section so as to pull the dog laterally.

15. The leash device of claim 14 wherein the second leash device section is not extendible.

16. The leash device of claim 14 wherein the second leash device section is extendible but requires more force than the first leash device section to extend.

17. The leash device of claim 14 wherein the second end of the first leash device section and the second end of the second leash device section each includes a quick release.

18. A reduced-pull leash device for coupling to a leash comprising:
   a first leash device section that is extendible, the first leash device section having a length, a first end and a second end; and
   a second leash device section, the second leash device section having a length, a first end, a second end and one or more mounting locations;
   wherein the length of the second leash device section is longer than the length of the first leash device section while the first leash device section is unextended, and wherein the second leash device section includes an adjustment member configured to allow the length of the second leash device section to be adjusted;
   wherein the first end of the first leash device section is configured to couple to one of the mounting locations of the second leash device section;

wherein the second end of the first leash device section is configured to couple to a dog harness at a location on top of a dog;

wherein the first end of the second leash device section is configured to couple to a dog leash;

wherein the second end of the second leash device section is configured to couple to a dog harness at a front location of the dog;

wherein the length of the first leash device section and the length of the second leash device section are configured so that the first leash device section extends when a dog pulls on the leash until the second leash device section becomes taut; and wherein once the second leash device section becomes taut, a lateral force is generated at the front location of the dog by the second leash device section so as to pull the dog laterally.

19. The leash device of claim 18 wherein the adjustment member of the second leash device section includes a strap slider.

20. The leash device of claim 18 wherein the adjustment member of the second leash device section includes a retraction device.

* * * * *